United States Patent
Lei et al.

(10) Patent No.: US 9,706,372 B2
(45) Date of Patent: Jul. 11, 2017

(54) SECURE SMS MESSAGING

(71) Applicant: General Motors LLC, Detroit, MI (US)

(72) Inventors: Yao Hui Lei, Windsor (CA); Richard Heines, Ortonville, MI (US); Kenneth L. Peirce, Grosse Pointe Farms, MI (US); Dipankar Pal, Sylvania, OH (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 14/244,525

(22) Filed: Apr. 3, 2014

(65) Prior Publication Data

US 2015/0289116 A1 Oct. 8, 2015

(51) Int. Cl.
*H04L 9/00* (2006.01)
*H04W 4/14* (2009.01)
*G06F 21/00* (2013.01)
*H04L 29/08* (2006.01)
*H04W 12/04* (2009.01)
*H04L 29/06* (2006.01)
(Continued)

(52) U.S. Cl.
CPC ............. *H04W 4/14* (2013.01); *H04L 9/006* (2013.01); *H04L 9/3242* (2013.01); *H04L 63/0428* (2013.01); *H04L 67/12* (2013.01); *H04W 4/046* (2013.01); *H04W 12/02* (2013.01); *H04W 12/04* (2013.01); *H04L 2209/24* (2013.01); *H04L 2209/84* (2013.01)

(58) Field of Classification Search
CPC . H04L 63/0428; H04L 51/38; H04L 12/5895; H04L 51/066; H04W 4/14; H04W 4/12; H04W 4/02; H04M 1/72552; H04M 3/42382

USPC ........ 455/466; 380/247, 270; 713/150, 168, 713/170, 181, 193
See application file for complete search history.

(56) References Cited

U.S. PATENT DOCUMENTS 6,046,990 A * 4/2000 Chennakeshu et al. ...... 370/317
6,556,586 B1 * 4/2003 Sipila .................. H04L 12/5895
370/467

(Continued)

FOREIGN PATENT DOCUMENTS

GB 2470250 B * 1/2012 ......... H04L 63/0428

OTHER PUBLICATIONS

3GPP TS 23.040 V 12.2.0 (Dec. 2013), Release 12, p. 27-29,75-76, 97-99.*

*Primary Examiner* — Alexander Lagor
(74) *Attorney, Agent, or Firm* — Christopher DeVries; Reising Ethington P.C.

(57) ABSTRACT

A mobile vehicle communications system and a method of sending one or more secure short message service (SMS) messages using that system. The method includes the steps of: (a) determining at a sender a data quantity associated with zero or more proprietary data parcels (PDPs) to send within one or more SMS messages; (b) configuring an encrypted payload of each of the one or more configured SMS messages to carry the total number of PDPs, wherein when the size of the payload would result in an SMS message exceeding 140 bytes, the configuring step includes configuring a plurality of SMS messages to carry the payload; and (c) transmitting from the mobile originated device one or more configured SMS messages.

13 Claims, 5 Drawing Sheets

(51) Int. Cl.
*H04W 4/04* (2009.01)
*H04W 12/02* (2009.01)
*H04L 9/32* (2006.01)

(56) References Cited

U.S. PATENT DOCUMENTS

| | | | |
|---|---|---|---|
| 6,597,918 B1* | 7/2003 | Kim | H04L 12/5835 370/236 |
| 7,039,708 B1* | 5/2006 | Knobl et al. | 709/227 |
| 2003/0078058 A1* | 4/2003 | Vatanen | H04L 9/3247 455/466 |
| 2003/0166396 A1* | 9/2003 | Vermelle et al. | 455/406 |
| 2003/0167204 A1* | 9/2003 | Makipaa | G06Q 30/02 705/14.14 |
| 2004/0012501 A1* | 1/2004 | Mazzara | G08C 19/28 340/870.11 |
| 2004/0030906 A1* | 2/2004 | Marmigere | H04L 12/5895 713/189 |
| 2004/0064688 A1* | 4/2004 | Jacobs | H04L 63/0245 713/150 |
| 2012/0302265 A1* | 11/2012 | Lei | H04L 12/189 455/466 |
| 2013/0275758 A1* | 10/2013 | Marlow | 713/171 |

* cited by examiner

SECURE SMS MESSAGING

TECHNICAL FIELD

The present invention relates to short message service (SMS) messaging.

BACKGROUND

Short message service (SMS) protocol may be used by a variety of telecommunication equipment. SMS messages may be sent and received by mobile devices and wired computer devices. The SMS message may use a maximum of 140 bytes and when GSM 7-bit characters are used, a maximum of 160 characters.

SUMMARY

According to an embodiment of the invention, there is provided a method of sending one or more secure short message service (SMS) messages, including the steps of: (a) determining at a sender a data quantity associated with zero or more proprietary data parcels (PDPs) to send within one or more SMS messages; (b) configuring an encrypted payload of each of the one or more configured SMS messages to carry the total number of PDPs, wherein when the size of the payload would result in an SMS message exceeding 140 bytes, the configuring step includes configuring a plurality of SMS messages to carry the payload; and (c) transmitting from the mobile originated device one or more configured SMS messages.

According to another embodiment of the invention, there is provided a method of sending one or more secure short message service (SMS) messages, including the steps of: (a) determining at a sender a data quantity associated with zero or more proprietary data parcels (PDPs) to send within at least one SMS message; and (b) when the determined data quantity of one or more PDPs is greater than a predetermined maximum for a single SMS message, (b1) configuring a plurality of SMS messages to carry the data of the one or more PDPs, wherein an SMS header of each of the plurality of SMS messages carry: a message index (MI) associated with a concatenated sequence of the SMS messages indicating an order within the sequence; wherein a payload of a first indexed SMS message carries: an internal header indicating the total number of PDPs, and the length of each of the PDPs, wherein a payload of the other indexed SMS messages carry: at least a portion of the PDP data; and (b2) transmitting from the sender the plurality of configured SMS messages.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below generally pertain to configuring, transmitting, and receiving short message service (SMS) messages. In some circumstances, it may be desirable to communicate proprietary data parcels (PDPs) between two or more wireless devices or between a mobile device and a server entity using SMS. The PDPs may include commands or instructions or may include sensitive informational data. For example, the PDP may be a command issued from one wireless device to another. The two wireless devices may be any two suitable devices; e.g., the disclosure below describes an operating environment that includes a call center and a vehicle telematics unit; e.g., the call center may use SMS to command the telematics unit (e.g., an SMS message carrying a PDP to unlock a vehicle door or start the engine). The disclosure below further describes how one or more PDPs may be sent using a single SMS message or a series of concatenated SMS messages. In some instances, this may improve the economy of SMS messaging between the sender and recipient—e.g., rather than sending one PDP per SMS message, the sender may convey the multiple PDPs using one or at least fewer SMS messages. It should be appreciated that the operating environment described below is merely one example, and other implementations are possible.

Communications System—

Figure 1:
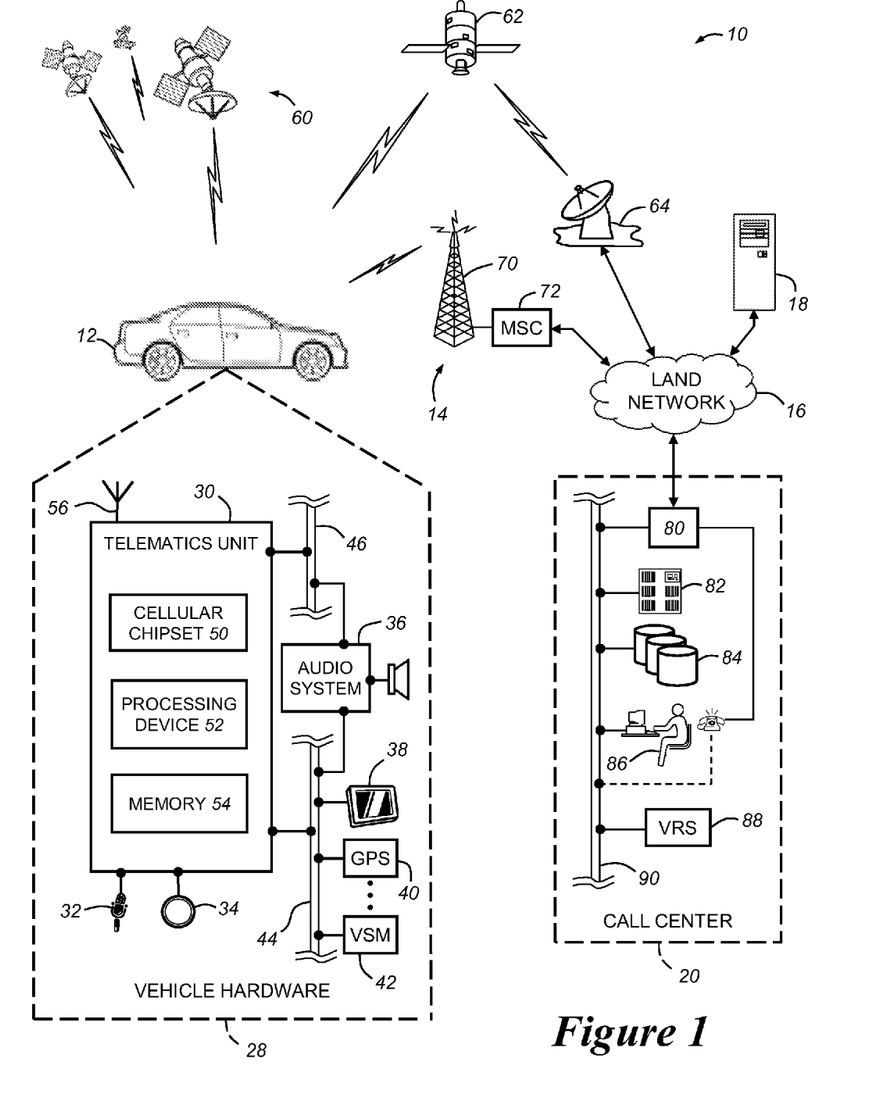
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art. In addition, data (e.g., PDPs) may be sent and received using short message service (SMS); and the telematics unit may be configured as mobile terminated and/or originated or as application terminated and/or originated.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. The land network 16 further may include one or more short message service centers (SMSCs) to store, forward, convert, and/or deliver SMS messages between a sender and a recipient. For example, the SMSC may be receive an SMS message from the call center 20 or a content provider (e.g., an external short messaging entity or ESME), and the SMSC may deliver the SMS message to the vehicle 12 (e.g., a mobile terminated device). SMSCs and their functionalities are known to skilled artisans. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Additionally, data (e.g., PDPs) may be sent and/or received using short message service (SMS); and the call center 20 may be configured as mobile terminated and/or originated or as application terminated and/or originated. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

In at least one implementation, the telematics unit 30 and call center 20 of the afore-described operating environment may be used to send and/or receive SMS messages having proprietary data parcels (PDPs). As previously described, the PDPs may include commands, instructions, or requests or may include sensitive informational data. For example, one PDP may include a command from the call center to the vehicle 12 to unlock the vehicle doors; another PDP may include a command to the vehicle to provide a vehicle diagnostics update; another PDP may include an informational of the current date and time. In other examples, one PDP from the vehicle to the call center may be a request for entertainment or infotainment services; another PDP may be GPS location data related information or configuration; and another PDP may be a response to a call center request (e.g., acknowledgement of receipt of transmission, various vehicle diagnostic data, etc.). Again, these are all merely examples; other implementations between the call center and vehicle also exist; further other commands, instructions, requests, and informational may exist in other operating environments.

Figure 2A:
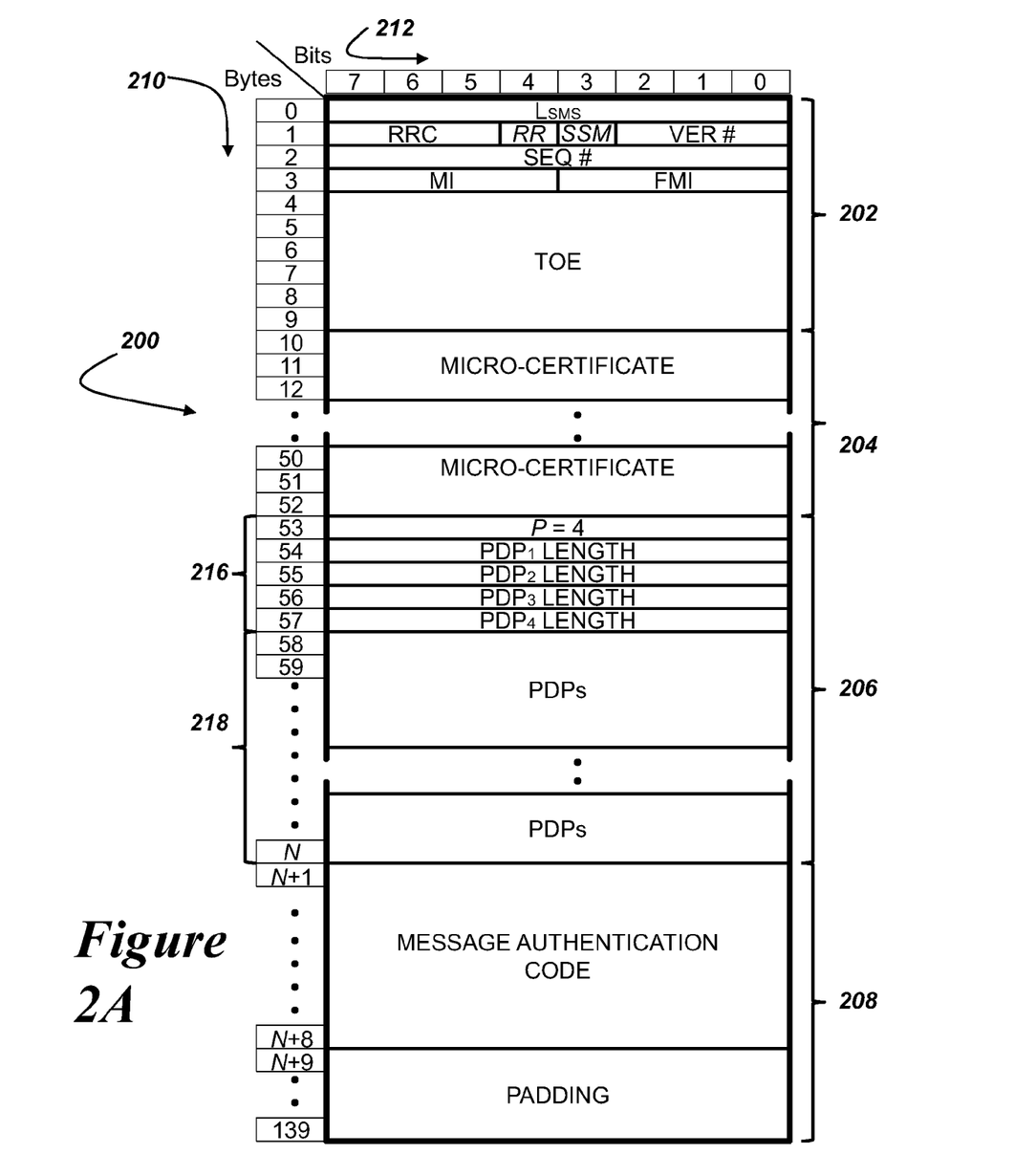
FIG. 2A illustrates one embodiment of a short message service (SMS) message architecture.

Prior to describing how the PDP is delivered between the call center and vehicles such as vehicle 12, the composition of the SMS or its architecture will be discussed. Turning to FIG. 2A, there is shown one embodiment of an architecture of a short message service (SMS) message 200. The illustrated SMS message 200 is divided into parts or sections including a primary or general or overall or SMS header 202, a first reserved or auxiliary portion 204, an SMS payload 206, and a second reserved or auxiliary portion 208. The architecture includes an example of how many bytes (e.g., the rows) 210 and/or bits (e.g., the columns) 212 each section (202, 204, 206, 208) may use or require. The quantities and groupings of bytes and bits shown are merely one example; other examples or implementations are possible. Each section will be discussed in turn beginning with the primary header 202.

In one embodiment, the primary header 202 may include the first ten bytes (e.g., bytes 0-9). Byte 0 may be an SMS message Length ($L_{SMS}$) or Length Value (e.g., the number of bytes in the entire SMS message that are not padding). For example, if the Length of the entire SMS message was 131 bytes, the length value may be "10000011" or if the SMS message was 140 bytes, the length value may be "10001011," each 0 or 1 corresponding to the bit columns (7 through 0).

In byte 1, bits 0-2 may include an SMS Version Number (VER #) (e.g., SMS 2.0 or "010"); bit 3 may indicate a secure short message (SSM), i.e., whether it is encrypted (e.g., true or false, "0" or "1"); bit 4 may indicate whether Response is Requested (RR) (e.g., true or false, "0" or "1"); and bits 5-7 may include a Request/Response Code (RRC) (e.g., used by the recipient of an SMS message; when not used it may be null or "000"). Byte 2 may include a Sequence Number (SEQ #); i.e., it may be a unique identifier to categorize multiple SMS messages that are part of an association or bundle of messages, as will be explained in greater detail below. In byte 3, bits 0-3 may include a final message index (FMI); and bits 4-7 may include a message index (MI). Both the FMI and MI may be binary representations of a numeral between 0 and 15 (e.g., "0000," "0001," . . . , "1111"). As will be explained in greater detail below, where multiple SMS messages are bundled and transmitted, the MI and FMI may be used to correlate one SMS message with respect to the other messages of the bundle. Bytes 4-9 may include a time of expiration (TOE) of the SMS message; e.g., the TOE may indicate a definite date and time when the SMS message is no longer valid (or it may indicate a period of time following its transmission from either the sender or the SMSC indicating when the message should expire).

The number of bytes of the first auxiliary portion 204 may vary. In one embodiment, the first auxiliary portion 204 may include bytes 10-52. Here, at least part of these bytes may carry information pertaining to a micro-certificate according to a public key infrastructure. As will be appreciated by skilled artisans, use of a public key may require a signed digital certificate. For example, an x.509 certificate may require 1024 bytes of space. However in FIG. 2, the digital certificate may be a special type of digital certificate known as a micro-certificate having approximately 44 bytes, as described in U.S. Patent Publication No. 2010/0202616, which is herein incorporated by reference in its entirety.

The number of bytes of the payload 206 also may vary. In the illustrated embodiment, the payload 206 extends from byte 53 to N, and the payload 206 includes a secondary or internal or concatenation or payload header 216 and a payload body 218. In the example shown in FIG. 2A, the internal header 216 includes bytes 53-57. Byte 53 indicates the total number P of PDPs in a sequence of PDPs sent according to one or more SMS messages. In the example shown, P is four (e.g., binary "100") and bytes 54-57 correspond to each of the four PDPs in the sequence. More specifically, bytes 54-57 indicate a PDP length (e.g., byte 54 is the binary length of $PDP_1$, byte 55 is the binary length of $PDP_2$, byte 56 is the binary length of $PDP_3$, and byte 57 is the binary length of $PDP_4$). The remaining bytes of the payload 206 include the PDPs themselves concatenated or strung together or at least as many PDPs as will feasibly fit within the payload 206, as the size of the SMS message 200 is limited to 140 bytes. This again will be discussed below.

The final section, the second auxiliary portion 208, may contain a MAC or message authentication code value and/or padding. The MAC value will be discussed in greater detail below. In the illustrated example of FIG. 2A, bytes N+1 to N+8 of the SMS message 200 carry or contain the MAC value. And bytes N+9 to 139 are illustrated as padding (the use of padding will be appreciated by skilled artisans).

Now turning to one example of sending the message 200 shown in FIG. 2A, the SMS message 200 may be used to send multiple PDPs where the size of the PDPs cause a single SMS message to exceed 140 bytes. According to one method 300 shown in FIG. 3, the call center 20 may configure multiple SMS messages (a bundle) and send them to the telematics unit 30 in the vehicle 12. The method 300 may begin at step 302 where the call center may determine a data quantity or binary quantity associated with zero or more PDPs. For example, if zero PDPs are to be sent, the data quantity may be 0 bytes. Where one or more PDPs are to be sent, the data quantity may vary (e.g., a value greater than 0 bytes). For example, the four PDPs shown in FIG. 2A (e.g., $PDP_1$, $PDP_2$, $PDP_3$, $PDP_4$) may have data quantities of 25 bytes, 75 bytes, 50 bytes, and 100 bytes, respectively. Thus, the total data quantity of the four PDPs may be 250 bytes. According to one implementation, the size of the PDPs may vary between 0 and 255 bytes and up to 16 SMS messages may be bundled together, if necessary.

Figure 3:
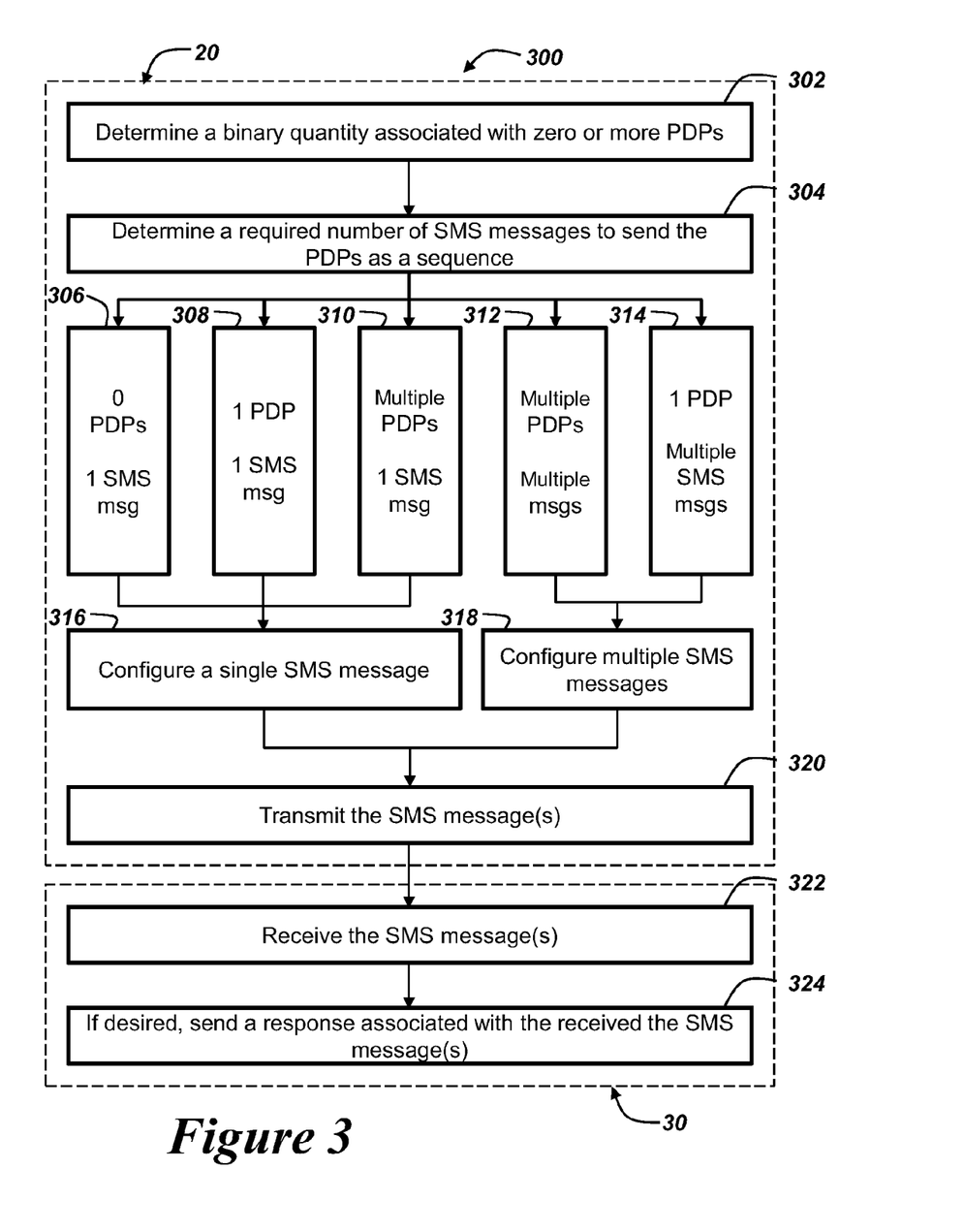
FIG. 3 illustrates a method of configuring and transmitting the SMS message shown in FIG. 2A.

In step 304, the method 300 may determine a required number of SMS messages needed to send the PDP(s) as a sequence. Thus, the call center 20 may evaluate the available payload space available in one or more SMS messages. For example, the payload 206 of an SMS message may have a practical limit when some of the 140 bytes are used for non-payload data such as the SMS header, the micro-certificate in the first auxiliary portion 204, the MAC value and/or padding in the second auxiliary portion 208, etc. Thus in at least one implementation, depending on the size of the non-payload data, the payload size may be less than a predetermined maximum (e.g., 100 bytes). Thus, if in one implementation the maximum payload data per SMS message is 90 bytes, sending the four PDPs would require three SMS messages. This evaluation may include accounting for the total size of $PDP_1$–$PDP_4$ (or 250 bytes) and the internal header 216 (or 5 bytes, i.e., bytes 53-57 of FIG. 2A). More specifically, (250 bytes+5 bytes)/90 bytes≈2.8 SMS messages which may be rounded up to a bundle of three SMS messages.

Steps 306-314 show various possible implementations depending on the number of PDPs to be sent and the number of SMS messages to be used. For example: step 306 illustrates zero PDPs as one SMS message; step 308 illustrates one PDP carried by one SMS message; step 310 illustrates multiple PDPs carried by one SMS message; step 312 illustrates multiple PDPs carried by a bundle of SMS messages; and step 314 illustrates one PDP carried by a bundle SMS messages. Continuing with the example discussed above, the method 300 would proceed with a determination that, in this implementation, having payload data of 255 bytes will necessitate multiple SMS messages (i.e., step 312).

In steps 316 and 318, the method configures the SMS message(s). These steps include configuring the primary header(s) 202, configuring the auxiliary portion(s) 204, configuring the payload 206 of one or more SMS messages (e.g., bundling the payload data into the quantity of SMS messages determined in step 304), and configuring the auxiliary portion(s) 208. These steps further may include encrypting the payload data.

In at least one implementation of step 316 (or 318), a MAC value is generated by a sender using a (keyed) cryptographic hash function (or MAC algorithm) of a body of data (e.g., a message of arbitrary length). For example, a first secret key (the sender's key) and an original message are the input to the hash function, and the MAC value is the output. Examples of suitable hash functions include MD5, SHA1, SHA256, just to name a few. Here, the original message may be the entire 250 byte message (i.e., the four PDPs discussed above). Continuing with the example, each of the three bundled SMS messages ($SMS_1$, $SMS_2$, $SMS_3$) may be assigned the same SMS Version Number, the same Request is Requested value, the same Request/Response Code, the same Sequence Number, the same FMI, and the same TOE. The Length ($L_{SMS}$) and the MI may differ in each bundled SMS message (as it indexes that particular SMS message; e.g., indexes it first, second, third, etc.). The $L_{SMS}$ may vary according to the total length of each bundled SMS message. And the MI value may enable at the message recipient a concatenation or organizing an order for the SMS messages of the bundle; e.g., for $SMS_1$, the value of MI may be "0000;" for $SMS_2$, the value of MI may be "0001;" and for $SMS_3$, the value of MI may be "0010." Consequently, the FMI may be the same as the last message index (MI) of the bundle (i.e., "0010" associated with $SMS_3$).

Steps 316 and 318 also may include the call center 20 configuring each payload (and determining the MAC value). For example, in step 316, the call center configures a single SMS message based on the data quantity of zero PDPs, one PDP, or multiple PDPs (derived from steps 306, 308, or 310). And in step 318, the call center configures multiple SMS messages based on the data quantity of one PDP or multiple PDPs (derived from steps 312 or 314). Continuing with the example above, the payloads 206 of the three SMS messages ($SMS_1$, $SMS_2$, $SMS_3$) are configured. The first SMS message of the bundle ($SMS_1$) may include the internal header 216. If feasible, the first SMS message may also carry additional payload—i.e., some of the PDP data as well. The second and third SMS messages ($SMS_2$, $SMS_3$) may be configured to carry the remainder of the PDP data. For example, in configuring the internal header 216, the first byte of the payload (e.g., FIG. 2A, byte 53) may indicate the number (P) of PDPs (e.g., P=4 PDPs or "00000100"). The next bytes may indicate the length (L) of each of the respective PDPs. For example, the length of $PDP_1$ (L=25 bytes or "00011001") may be carried by byte 54, the length of $PDP_2$ (L=75 bytes or "01001011") may be carried by byte 55, the length of $PDP_3$ (L=50 bytes or "00110010") may be carried by byte 55, and the length of $PDP_4$ (L=100 bytes or "01100100") may be carried by byte 56.

Figure 2B:
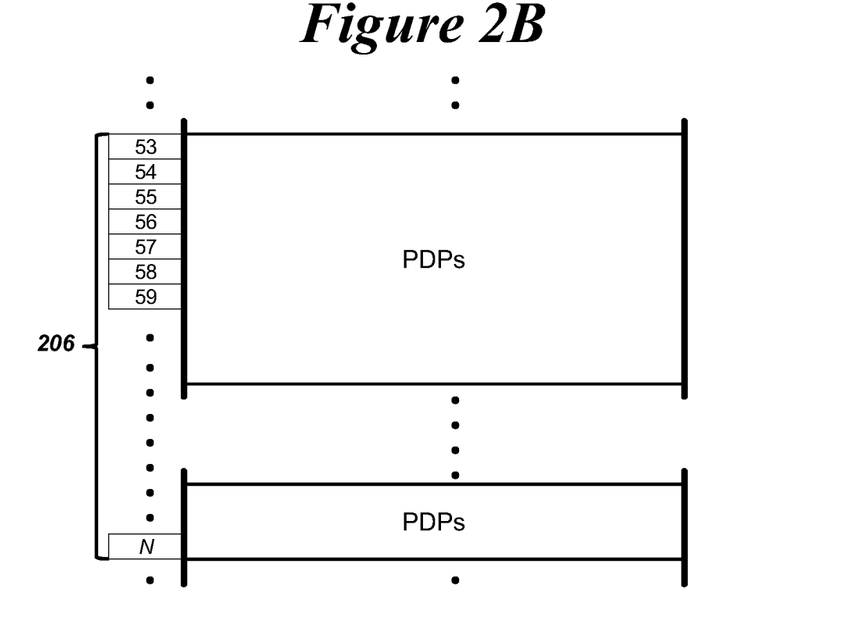
FIG. 2B illustrates another embodiment of the SMS architecture shown in FIG. 2A.

Since the internal header of $SMS_1$ consumes only 5 bytes in this example, there exists additional payload space that may be configured by the call center 20 to carry some of the PDP data. In addition, the entire payload space of $SMS_2$ and $SMS_3$ is available as shown in FIG. 2B; i.e., only the first SMS message ($SMS_1$) in the bundle may need to carry the internal header 216. For example (FIG. 2A), the first SMS message may be configured to carry $PDP_1$ (25 bytes) and the first 60 bytes of $PDP_2$ (totaling 90 bytes; i.e., 5 bytes+25 bytes+60 bytes). The payload of the second message (FIG. 2B) may be configured to carry the last 15 bytes of $PDP_2$, all of $PDP_3$ (50 bytes), and the first 25 bytes of $PDP_4$ (totaling 90 bytes; i.e., 15 bytes+50 bytes+25 bytes). And the payload of the third SMS message (FIG. 2B) may be configured to carry the remaining 75 bytes of $PDP_4$. This of course is merely one example and other combinations are possible.

Thereafter, each of the payloads 206 may be encrypted. For example, the payload data of $SMS_1$, $SMS_2$, and $SMS_3$ may be encrypted with a private key held by the call center according to a public key infrastructure (PKI) and the micro-certificate used for encryption may be configured as part of the first auxiliary portions 204 of each of the SMS messages, according to the micro-certificate disclosed in U.S. Patent Publication No. 2010/0202616, as discussed above. Other implementations include using a pre-shared key (PSK)—i.e., identical keys held by both the sender and recipient, or a combination of PKI and PSK. Other security techniques may also be used (e.g., nonce challenges, etc.). Alternatively, the payload data of $SMS_1$, $SMS_2$, and $SMS_3$ may be encrypted individually rather than as a whole.

Thereafter, the MAC value determined by the call center may be added to or carried by the second auxiliary portion 208 of each of the messages; e.g., it may be present in each of $SMS_1$, $SMS_2$, and $SMS_3$. As appropriate, where the auxiliary portion 208 does not fill all of the available bytes, padding (e.g., zeros or "00000000") may be added to any of the remaining unused bytes in the second auxiliary portions 208 of the SMS messages ($SMS_1$, $SMS_2$, $SMS_3$).

Having configured each of the SMS messages in the bundle, the messages ($SMS_1$, $SMS_2$, $SMS_3$) may be transmitted at step 320. Thus, they may be sent from the call center 20 to the SMSC and thereafter to the vehicle 12 via the telematics unit 30. Transmission and receipt of SMS messages is known to skilled artisans. At step 322, the messages ($SMS_1$, $SMS_2$, $SMS_3$) may be received and validated. Validation may include validating the MAC value received in the auxiliary portion(s) 208. For example, the recipient (e.g., vehicle 12) may validate the original message (e.g., all 250 bytes) using the suitable MAC algorithm used by the sender (e.g., the call center 20). More specifically, the recipient may determine another MAC value by providing the original message and a second secret key as input to the same hash function. Having performed the calculation, the recipient may then compare this new MAC value to the transmitted/received MAC value (i.e., the MAC value carried by the auxiliary portion(s) 208). When the values of the two MAC values match, the recipient may determine that the original message was unaltered, unmodified or otherwise not tampered with. The second secret key may be identical to the first secret key and may be provided by the sender (e.g., the call center) to the recipient (e.g., vehicle 12) via a secure communication channel or other suitably secure means.

In some circumstances, the telematics unit 30 may discard all the bundled SMS messages if the transmitted MAC value is not validated. The telematics unit 30 also may discard the bundle of SMS messages for other reasons. For example, if the bundle of SMS messages does not have the same SMS Version Number or a valid TOE. Provided the MAC value, Version Number, and TOE are valid, the telematics unit next may attempt to arrange the SMS messages according their message indexes (MIs). Thus, where the FMI indicates three messages (e.g., "0010"), the telematics unit may validate that three messages with MI equaling "0000," "0001," and "0010" have all been received prior to the TOE. If any of these items cannot be validated (or are missing), the telematics unit may flag a potential error.

Using the MIs, the payloads 206 of each of the SMS messages can be concatenated—e.g., extracting each of the encrypted SMS payloads and stringing them end-to-end according to the sequential order of the MIs. Thus, although $PDP_1$ was divided between $SMS_1$ and $SMS_2$ and $PDP_3$ was divided between the $SMS_2$ and $SMS_3$, all of the PDPs may be re-arranged into their original sequence.

Step 322 may also include extracting the micro-certificate and using it to decrypt the concatenated payloads 206 of the messages ($SMS_1$, $SMS_2$, $SMS_3$). If the micro-certificate for any of the SMS messages is not identical or if any of the encryption cannot be authenticated, the telematics unit 30 may flag a potential error. It will be appreciated that this step may include decryption using PKI, PSK, or any combination thereof. The inability to authenticate any of the SMS bundle may indicate malicious tampering or transmission error (and the bundle of SMS messages, and the PDPs which they carry, may be ignored and/or deleted).

Where an error is flagged, the entire SMS message bundle may be ignored and/or deleted. In addition, the telematics unit 30 may send a response indicating the error in step 324; e.g., this may be a predetermined Request/Response Code (e.g., a three digit binary number indicating the error). In addition, the telematics unit may send a response to indicate that the message bundle was received untampered and fully intact (e.g., a predetermined Request/Response indicating an acknowledgement). In one implementation, the response in step 324 is a retransmission of the SMS message bundle received; i.e., the telematics unit 30 reconfigures the PDPs ($PDP_{1-4}$) into messages ($SMS_1$, $SMS_2$, $SMS_3$) and sends them to the call center 20 with a different predetermined Request/Response Code (i.e., one indicating that it is a response message). Other implementations of the response in step 324 are possible; and in some instances, no response may be sent.

Alternative embodiments also exist. For example, one single SMS message (FIG. 2A) may carry all of the PDPs (i.e., without additional SMS messages using the architecture of FIG. 2B). For example, if $PDP_1$, $PDP_2$, $PDP_3$, and $PDP_4$ all were only 10 bytes in length, then $SMS_1$ could carry all the payload data (the 5 bytes of the internal header 216 and the 40 bytes of $PDP_{1-4}$) and $SMS_2$ and $SMS_3$ would not be used. In the method illustrated in FIG. 3, the method would proceed from step 304 to step 310 to step 316.

Similarly, if only one PDP and one SMS was needed (e.g., a relatively small PDP was being sent, e.g., less than 100 bytes), the method 300 would proceed from step 304 to step 308 to step 316.

Figure 2C:
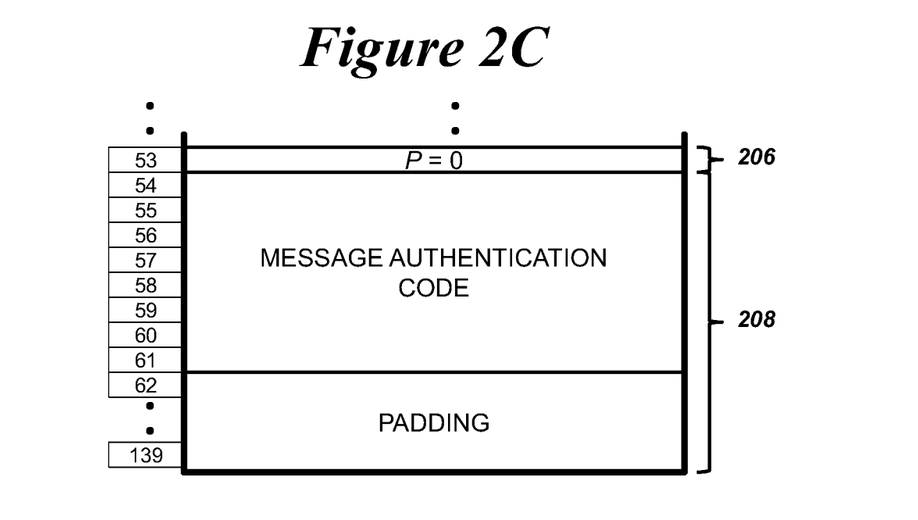
FIG. 2C illustrates another embodiment of the SMS architecture shown in FIG. 2A.

Another alternative embodiment is shown in FIG. 2C. Here, no PDPs are sent; thus, P=0 (e.g., "00000000" or null). Thus, the internal header is 1 byte in length (e.g., "00000000"). Since no PDPs are being sent, the entire payload 260' is only this 1 byte in length (e.g., byte 53). This payload may still be encrypted and the method shown in FIG. 3 would proceed from step 304 to step 306 to step 316.

Another alternative embodiment could include a single PDP that is long enough to require multiple SMS messages. For example, if $PDP_1$ was 250 bytes in length, a bundle of three SMS messages ($SMS_1$, $SMS_2$, $SMS_3$) might be used. As previously discussed, $SMS_1$ may include at least an internal header, and the PDP data may be distributed between $SMS_1$, $SMS_2$, and $SMS_3$, as appropriate. Here, the method 300 would proceed from step 304 to step 314 to step 318.

In another implementation using the MAC, the second key (i.e., held by the recipient vehicle 12) may be different from the first key (i.e., held by the sender call center 20). For example, the second key may be a public key associated with the first key. In this instance, the recipient may receive a transmitted copy of the original message and the transmitted MAC value. Using the same hash function as the sender, the recipient may provide the transmitted message and the second key as input. The output may be another MAC value. If this MAC value identically matches the transmitted copy of the original MAC value, then the recipient may determine (validate) that the transmitted copy of the original message was unaltered, unmodified or otherwise not tampered with. This is merely another example of using a MAC value and a MAC algorithm; other examples will be apparent to skilled artisans.

Figure 4:
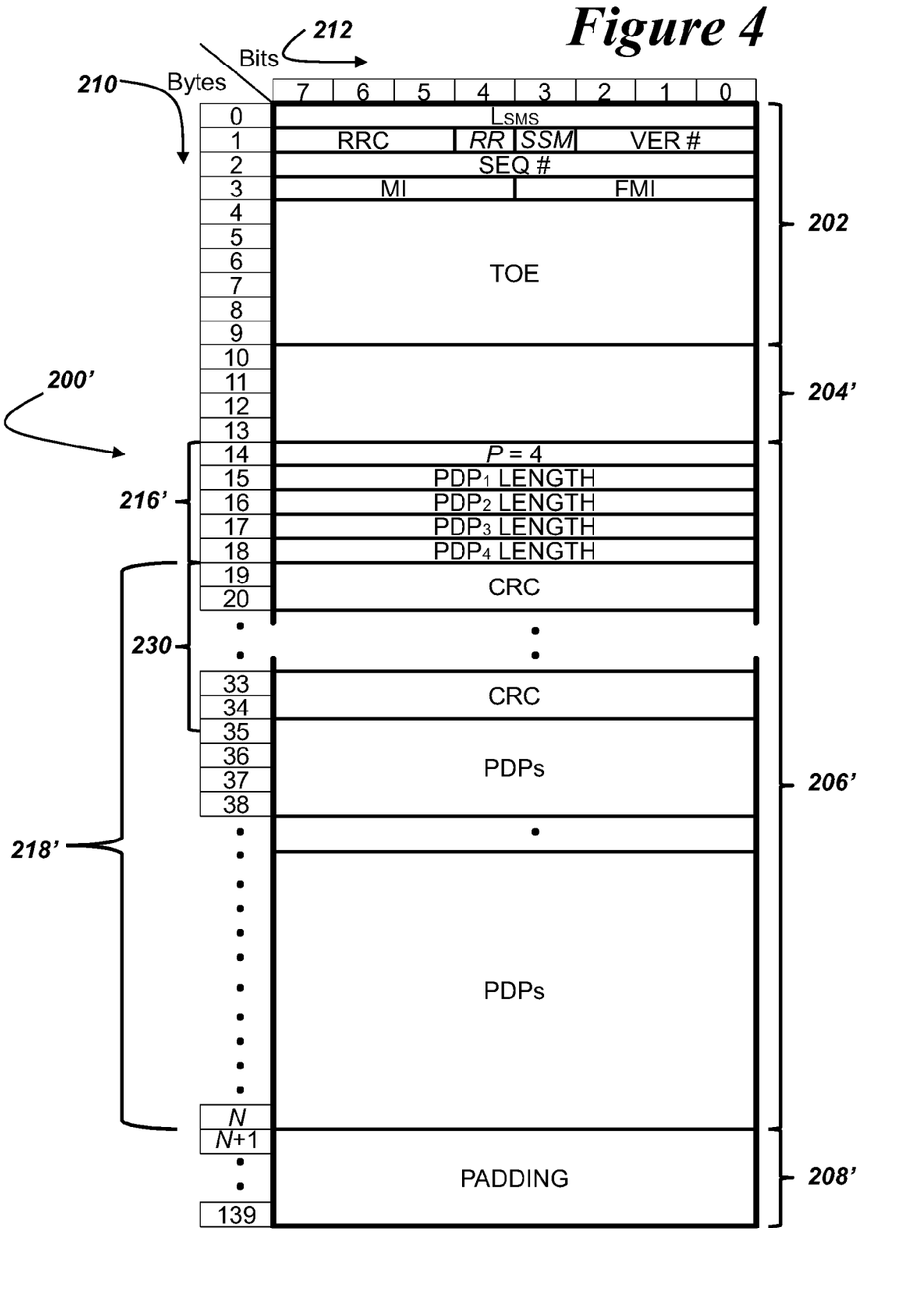
FIG. 4 illustrates another embodiment of a short message service (SMS) message architecture.

Another alternative embodiment is shown in FIG. 4. In this embodiment, the primary header 202 may be the same;

however, the first auxiliary portion, the payload, and the second auxiliary portion may differ. In FIG. 4, the first auxiliary portion 204' may be shorter and include a limited number of unused or reserved bytes (e.g., four bytes or bytes 10-13). The payload 206' may include an internal header 216' (e.g., byte 14). As previously described, it may indicate how many PDPs exist and their respective lengths (e.g., bytes 15-18). The payload 206' also may include a validating portion 230. In one implementation, the validating portion 230 carries a cyclic redundancy check (CRC) and consumes 16 bytes (e.g., bytes 19-34). As previously discussed, the remainder of the payload 206' of $SMS_1$ may carry some (or all) of the PDP data. Lastly, in this example, the second auxiliary portion 208' includes only padding.

The method 300 may implement the micro-certificate, as previously discussed. The payload 206' may be encrypted—i.e., including validity portion 230. When the SMS message(s) are received, a key held by the recipient (e.g., the telematics unit) may be used to decrypt the payload 206'. In addition to the previously described techniques, the CRC may be used to validate that the SMS message(s) are not corrupt (e.g., using the SMS message length ($L_{SMS}$) and according to known techniques).

Thus, there has been disclosed various architectures for an SMS message for carrying proprietary data parcels which may contain commands, instructions, and/or sensitive informational data. In addition, there has been disclosed various secure SMS messaging techniques to transmit these PDPs and consolidate the number of SMS messages sent.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of sending one or more secure short message service (SMS) messages, comprising the steps of:
   (a) determining at a sender a data quantity associated with zero or more proprietary data parcels (PDPs) to send within at least one SMS message;
   (b) when the determined data quantity of one or more PDPs is greater than a predetermined maximum for a single SMS message,
   (b1) configuring a plurality of SMS messages to carry the data of the one or more PDPs,
   wherein an SMS header of each of the plurality of SMS messages carry a message index (MI) associated with a concatenated sequence of the SMS messages indicating an order within the sequence;
   wherein a payload of a first indexed SMS message carries an internal payload header indicating the total number of PDPs and the length of each of the PDPs,
   wherein a payload of the other indexed SMS messages carry at least a portion of the PDP data; and
   (b2) transmitting from the sender the plurality of configured SMS messages; and
   (c) when the determined data quantity of one or more PDPs is less than or equal to a predetermined maximum for a single SMS message,
   (c1) configuring a single SMS message to carry the data of one or more PDPs, wherein an SMS header of the single SMS message carries a message index (MI) indicating it is the only SMS message of a sequence,
   wherein a payload of the single SMS message carries an internal payload header indicating the total number of PDPs and the length of each of the PDPs; and
   (c2) transmitting from the sender the configured single SMS message,
   wherein the payload of the single SMS message is encrypted according to a public key infrastructure (PKI), using a pre-shared key (PSK), or both, wherein the payload of the configured single SMS message of step (c2) further carries a cyclic redundancy check (CRC), wherein the single SMS message further carries a micro-certificate carrying a public key associated with a private key.

2. A method of sending one or more secure short message service (SMS) messages, comprising the steps of:
   determining at a sender how many SMS messages are to be used to transmit two or more proprietary data parcels (PDPs) to a recipient, wherein the determination includes determining that one or more SMS messages are to be used to transmit the two or more PDPs and wherein the determination is at least partially based on a total data size of the two or more PDPs to be carried collectively by the one or more SMS messages;
   prior to transmitting the one or more SMS messages, configuring the one or more SMS messages, wherein the configuring step includes:
   when it is determined that there is more than one SMS message to be used to transmit the two or more PDPs, configuring each of the SMS messages to include an SMS header having indexing information, wherein the indexing information enables the recipient to re-order the SMS messages;
   configuring a first SMS message of the one or more SMS messages to include an internal header within a payload of the first SMS message, wherein the internal header includes information associated with a quantity representing the number of PDPs that are carried by the one or more SMS messages and a data length of each of the two or more PDPs; and
   configuring each of the one or more SMS messages to include a cyclical redundancy check (CRC) in the payload; and
   transmitting from the sender to the recipient the two or more PDPs using the one or more SMS messages;
   wherein the payload of at least the first SMS message is encrypted according to a public key infrastructure (PKI), using a pre-shared key (PSK), or both.

3. The method of claim 2, wherein, when it is determined that there is only one SMS message to be used to transmit the two or more PDPs, then configuring the single SMS messages to include a micro-certificate carrying a public key associated with a private key.

4. A method of sending one or more secure short message service (SMS) messages, comprising the steps of:

evaluating one or more proprietary data parcels (PDPs) to determine how many SMS message(s) are to be used to transmit the one or more PDPs, wherein the evaluation is based on a total size of the one or more PDPs;

in response to the evaluating step:

configuring each of the one or more SMS messages to include an SMS header and a payload;

when it is determined that there is more than one SMS message to be used to transmit the one or more PDPs, configuring each of the SMS headers to include indexing information enabling the recipient of the SMS messages to order the SMS messages and to determine whether all of the SMS messages were received;

when it is determined that there is more than one SMS message to be used to transmit two or more PDPs, configuring a first SMS message of the SMS messages to include an internal header that comprises information representing the total number of PDPs and a data size for each of the PDPs;

prior to transmitting the one or more SMS messages, encrypting each of the payloads of the one or more SMS messages according to a public key infrastructure (PKI), using a pre-shared key (PSK), or both; and transmitting the one or more SMS messages from a sender to a recipient.

5. The method of claim 4, wherein the sender is a vehicle call center and the recipient is a telematics unit in a vehicle.

6. The method of claim 5, wherein at least one of the one or more proprietary data parcels includes a command from the call center to the vehicle to perform a vehicle operation or function.

7. The method of claim 4, wherein the encrypting step further comprises: determining a different message authentication code (MAC) for each of the one or more SMS messages, and wherein the configuring step further comprises: determining a data size of the SMS payload for each of the one or more SMS messages in consideration of a data size of each respective SMS header and a data size of each respective MAC.

8. The method of claim 7, wherein each of the one or more SMS messages transmitted to the recipient includes the MAC associated with the encryption of the respective SMS payload.

9. The method of claim 4, wherein the encrypting step further comprises: determining a single message authentication code (MAC) associated with each of the proprietary data parcels of the one or more SMS messages, and wherein the configuring step further comprises: determining a data size of the SMS payload for each of the one or more SMS messages in consideration of a data size of each respective SMS header and a data size of the MAC.

10. The method of claim 9, wherein each of the one or more SMS messages transmitted to the recipient includes the MAC.

11. The method of claim 4, wherein the SMS payload of each of the one or more SMS messages includes a cyclic redundancy check (CRC).

12. The method of claim 4, wherein the SMS payload of each of the one or more SMS messages includes a micro-certificate.

13. The method of claim 4, further comprising receiving at least one of the one or more SMS messages at the recipient, wherein the recipient ignores all of the one or more SMS messages when: the recipient does not receive all of the one or more SMS messages before a time of expiration, the recipient is unable to validate a message authentication code (MAC) associated with each of the one or more SMS messages, or the recipient is unable to validate that the MACs associated with each of the one or more plurality of SMS messages is identical.

* * * * *